United States Patent [19]
Hamell et al.

[11] Patent Number: 5,890,450
[45] Date of Patent: Apr. 6, 1999

[54] LINEAR STROKE VALVE POSITION INDICATOR

[75] Inventors: Robert S. Hamell, Houston; Harold B. Skeels, Kingwood; Christopher D. Bartlett; Christopher E. Cunningham, both of Spring, all of Tex.

[73] Assignee: FMC Corporation, Chicago, Ill.

[21] Appl. No.: 886,589

[22] Filed: Jul. 1, 1997

[51] Int. Cl.[6] ................................................. F16K 37/00
[52] U.S. Cl. ............................................................ 116/277
[58] Field of Search .................................... 116/271, 272, 116/277, 284, 285, 288; 137/553, 554, 556, 551, 556.3; 91/1; 92/63, 136; 251/355, 58

[56] References Cited

U.S. PATENT DOCUMENTS

| | | | |
|---|---|---|---|
| 4,635,901 | 1/1987 | Pond | 251/355 |
| 4,940,011 | 7/1990 | Wilkerson et al. | 116/277 |

*Primary Examiner*—Frank G. Font
*Assistant Examiner*—Michael P. Stafira
*Attorney, Agent, or Firm*—Henry C. Query, Jr.

[57] ABSTRACT

The present invention is directed to a valve position indicator for indicating an open or closed position of a valve having a valve stem, the valve position indicator comprising a body adapted to be mounted to a subsea xmas tree structure, a traveling block movably connected to the body by at least one guide bolt, the traveling block including a threaded hole for engaging a threaded extension shaft which is coupled to the valve stem, a rigid tube connected to the body and having first and second open ends, and a coiled spring member having one end connected to the traveling block and the other end extending through the first end of the rigid tube, wherein the extension of the spring member beyond the second end by a predetermined amount provides a visual indication that the valve is in its open or closed position, whereby movement of the traveling block in response to actuation of the valve will push or pull the spring member through the tube to provide the desired visual indication.

1 Claim, 2 Drawing Sheets

LINEAR STROKE VALVE POSITION INDICATOR

BACKGROUND OF THE INVENTION

The present invention is related to a valve position indicator for providing a visual indication of the open or closed position of a valve.

Valves are used in subsea xmas trees to control the flow of oil and gas from subsea wells. In substantial water depths, these valves are typically actuated either hydraulically from a surface vessel or directly by a remote operated vehicle (ROV). In either case, it is important for the operator to have visual confirmation that the valve is in its open or closed position to ensure that the valve is functioning properly.

In certain prior art designs, such a visual indication is provided by a "flag" which is connected through a series of linkages to a threaded drive which in turn is coupled to the valve stem. Thus, when the valve is either opened or closed, the valve moves the flag either into or out of a "window", e.g. a hole formed in the ROV panel, to provide the necessary indication of the position of the valve. However, this design is somewhat complex and consequently difficult and expensive to manufacture.

SUMMARY OF THE INVENTION

In accordance with the present invention, these and other disadvantages are overcome by providing a valve position indicator for indicating an open or closed position of a valve having a valve stem, the valve position indicator comprising a body adapted to be mounted to a subsea xmas tree structure, a traveling block movably connected to the body by at least one guide bolt, the traveling block including a threaded hole for engaging a threaded extension shaft which is coupled to the valve stem, a rigid tube connected to the body and having first and second open ends, and a coiled spring member having one end connected to the traveling block and the other end extending through the first end of the rigid tube, wherein the extension of the spring member beyond the second end by a predetermined amount provides a visual indication that the valve is in its open or closed position.

Accordingly, if the valve is actuated hydraulically from a surface vessel, the consequent linear motion of the extension shaft will move the traveling block relative to the body and thereby push or pull the spring member through the tube to provide the desired visual indication. Alternatively, if the valve is actuated manually, e.g. by an ROV, the rotation of the extension shaft will similarly move the traveling block and thereby push or pull the spring member to provide the visual indication.

The resulting invention is thus comprised of a few parts which are easy to fabricate and assemble. In addition, the invention may be used on a variety of valve and xmas tree configurations without the need to size the components of the position indicator accordingly.

These and other advantages of the present invention will be made more apparent by the following detailed description, with reference to the accompanying drawings.

DETAILED DESCRIPTION OF THE PREFERRED EMBODIMENTS

Figure 1:
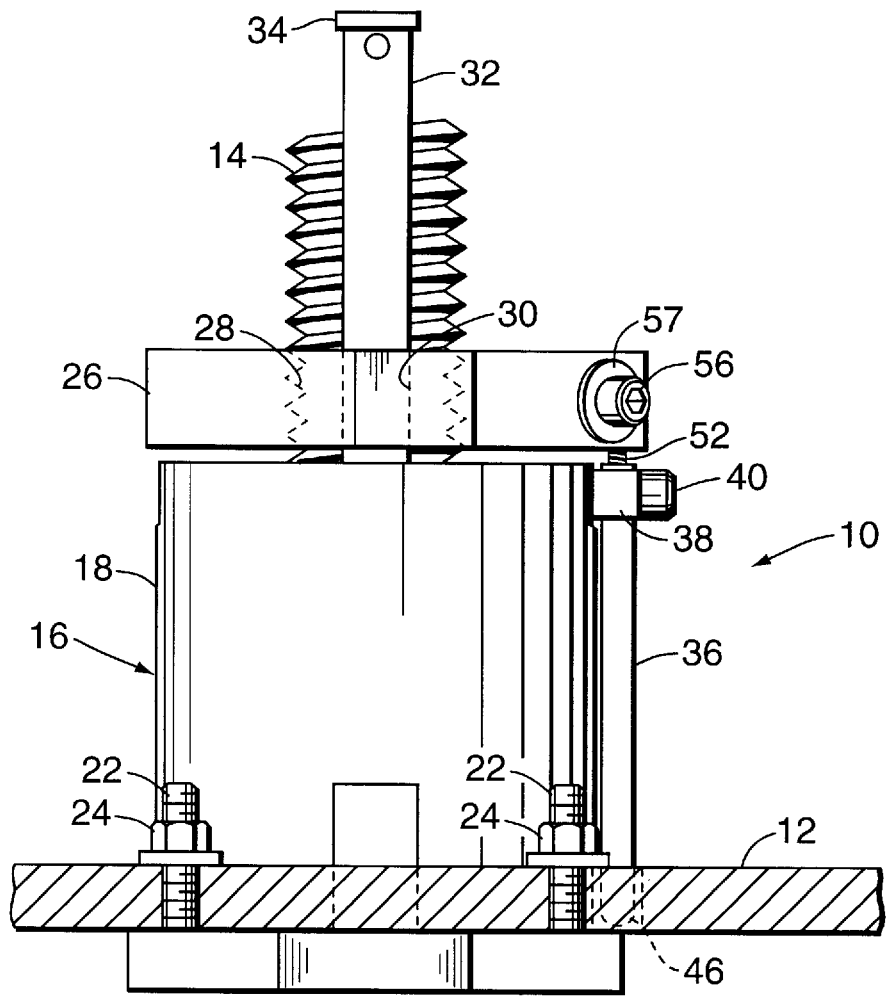
FIG. 1 is a side elevation view of the valve position indicator of the present invention.

Referring to FIG. 1, the valve position indicator of the present invention, indicated generally by reference number 10, is shown mounted to a subsea structure, in this instance an ROV panel 12. As is known by those in the art, the ROV panel 12 is mounted to a subsea xmas tree structure (not shown) opposite one or more fluid control valves (not shown). A threaded extension shaft 14 couples the stem of one such valve to an ROV receptacle 16 which is mounted to the ROV panel 12. In this manner, an ROV can engage the extension shaft 14 through the receptacle 16 and rotate it to manually open or close the valve.

As illustrated in the Figures, the position indicator 10 is shown to comprise a body 18 which is inserted through an opening 20 in the ROV panel 12 and secured therein by a number of cap screws and nuts 22, 24. In the illustrated embodiment, the body 18 corresponds to the ROV receptacle 16. Therefore, the manner of connecting the body 18 to the ROV panel 12 and the means for rotatably coupling the extension shaft 14 to the body 18 are similar to those typically used for ROV receptacles. However, the body 18 need not correspond to an ROV receptacle, and the present invention contemplates using any structure for the body 12 which is capable of interacting with the components of the position indicator 10 in the manner described below.

Figure 2:
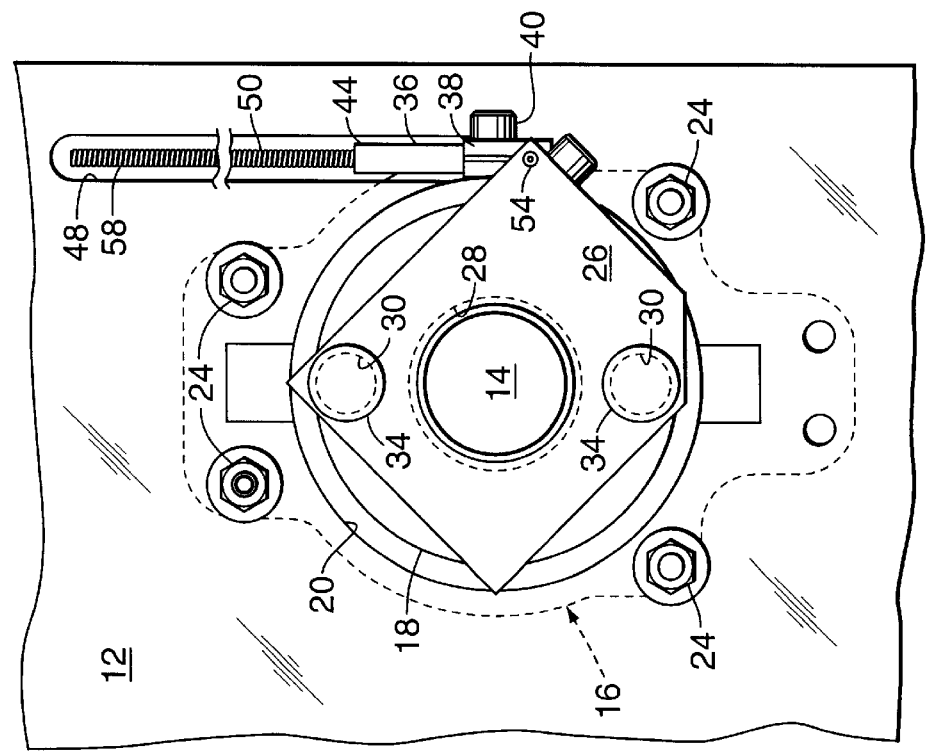
FIG. 2 is a top plan view of the position indicator depicted in FIG. 1.

Referring to FIGS. 1 and 2, the position indicator 10 of the present invention also comprises a traveling block 26 having a centrally positioned threaded hole 28 which threadably engages the extension shaft 14. The traveling block 26 also includes a number of apertures 30, each of which slidably receives a guide bolt 32 which has one end secured to the body 18 and an enlarged opposite end 34 for limiting the linear movement of the traveling block 26. In this manner, the traveling block 26 is linearly movable with respect to the body 18, but is retained on the guide bolts 32 by the enlarged ends 34. Rotation of the extension shaft 14, for example by an ROV, will effect linear movement of the traveling block 26 with respect to the body 18 due to the threaded engagement of the shaft 14 with the hole 28. In addition, hydraulic actuation of the valve will induce axial movement in the extension shaft 14, which will in turn effect linear movement of the traveling block 26 due to the engagement of the threaded shaft 14 with the threaded hole 28.

Figure 3:
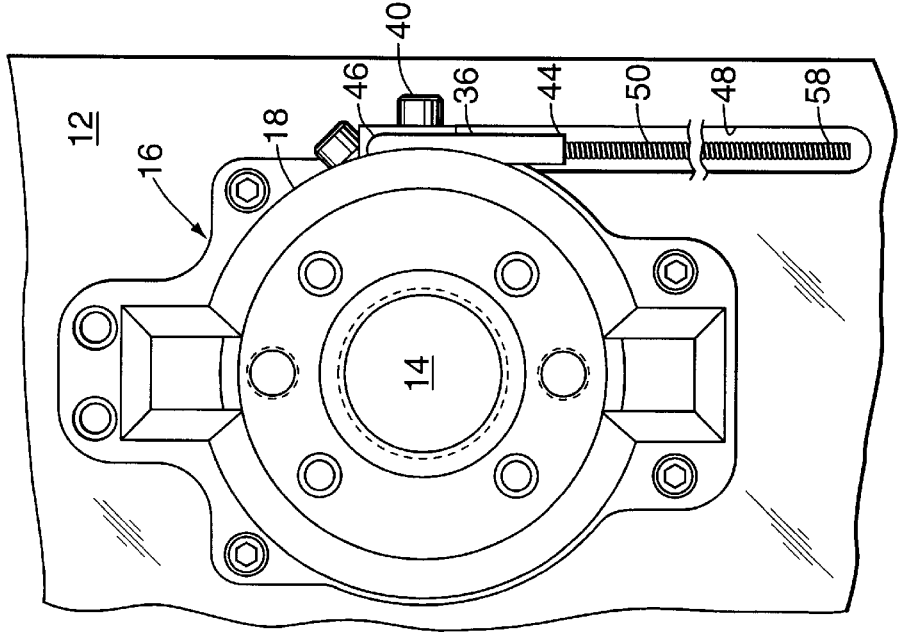
FIG. 3 is a bottom plan view of the position indicator depicted in FIG. 1.

The position indicator 10 further comprises a preferably rigid tubular member 36 which is connected to the body 18 by any suitable means, such as a collet and bolt arrangement 38, 40. The tubular member 36 comprises a first end 42 opening toward the traveling block 26 and a second end 44 (FIGS. 2 and 3) which is selected to open toward a position adjacent the subsea structure which may be visually observed. In the embodiment of the invention depicted in the Figures, the tubular member 36 includes a roughly ninety degree bend 46 which positions the second end 44 to open toward a window 48 formed in the ROV panel 12.

An axially rigid but radially flexible member, such as a coiled spring 50, is positioned within the tubular member 36. A first end 52 of the spring 50 extends beyond the first end 42 of the tubular member 36 and is received within an aperture 54 of the traveling block 26 and held therein by a cap screw 56 and washer 57. The spring 50 is sized such that a second end 58 of the spring 50 will extend through the second end 44 of the tubular member 36 and into the window 48 when the traveling block 26 is adjacent the body 18, but will retreat toward or into the second end 44 and out of the window 48 when the traveling block is at its farthest position from the body 18. During assembly of the position indicator 10 with the extension shaft 14, the position of the traveling block 26 adjacent the body 18 will correspond to a either a valve open or closed position and the position of the traveling block 26 farthest from the body 18 will correspond to the opposite valve position.

During operation of the present invention, actuation of the valve between its open and closed positions, either hydraulically or manually, will effect movement of the traveling block 26 between its positions adjacent the body 18 and farthest from the body 18. The traveling block 26 will in turn push or pull the spring 50 through the tubular member 36. In this manner, the second end 58 of the spring 50 will be pushed into or pulled from the window 48. The presence of the second end 58 in the window 48 will provide a visual indication that the valve is in either its open or closed position, and the absence of the second end 58 from the window 48 will provide a visual indication of the opposite valve position. It should be noted that the window 48 is not a necessary feature of the present invention; the above-described visual indications could be provided merely by observing the extent the second end 58 of the spring 50 extends beyond the second end 44 of the tubular member 36.

In the preferred embodiment of the invention, the traveling block is constructed of a UHMW (Ultra High Molecular Weight Polyethylene) based plastic. This is a light-weight material which is able to withstand the corrosive subsea environment and at the same time provide lubricity for the guide bolts 32. In addition, the material is sufficiently strong to support the weight of the extension shaft 14 and centralize it within the ROV receptacle 16. The tubular member 36 is preferably made from a copper based alloy, such as 90/10 Cu—Ni, which naturally inhibits marine growth which could interfere with the movement of the spring 50 within the tubular member 36. Finally, the spring 50 is preferably made of a material such as Hastelloy C-276 which has a high modulus and the ability to resist corrosion in a subsea environment.

Thus, the present invention provides a relatively simple, yet durable, valve position indicator which is consequently simple and relatively inexpensive to manufacture.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

What is claimed is:

1. A valve position indicator for indicating an open or closed position of a valve having a valve stem, the valve position indicator comprising:

a body adapted to be mounted to a subsea xmas tree structure;

a traveling block movably connected to the body by at least one guide bolt, the traveling block including a threaded hole for engaging a threaded extension shaft which is coupled to the valve stem;

a tubular member connected to the body and having first and second open ends; and a coiled spring member having a first end connected to the traveling block and a second end extending through the first end of the tubular member;

wherein the extension of the second end of the spring member beyond the second end of the tubular member by a predetermined amount provides a visual indication that the valve is in its open or closed position;

wherein movement of the traveling block in response to actuation of the valve will push or pull the spring member through the tubular member to provide the desired visual indication.

\* \* \* \* \*